United States Patent
Micard et al.

(10) Patent No.: US 12,460,925 B2
(45) Date of Patent: Nov. 4, 2025

(54) METHOD FOR THE COMPUTER ASSISTED DETERMINATION OF PHYSICAL PROPERTIES OF A POROUS LAYER DISPOSED ON A SURFACE OF SUBSTRATE

(71) Applicant: UNIVERSITÄT KONSTANZ, Constance (DE)

(72) Inventors: Gabriel Micard, Constance (DE); Yves Patrick Botchak Mouafi, Reichenau (DE); Barbara Terheiden, Constance (DE)

(73) Assignee: UNIVERSITÄT KONSTANZ, Constance (DE)

( * ) Notice: Subject to any disclaimer, the term of this patent is extended or adjusted under 35 U.S.C. 154(b) by 170 days.

(21) Appl. No.: 18/263,422

(22) PCT Filed: Jan. 29, 2021

(86) PCT No.: PCT/EP2021/052129
§ 371 (c)(1),
(2) Date: Jul. 28, 2023

(87) PCT Pub. No.: WO2022/161618
PCT Pub. Date: Aug. 4, 2022

(65) Prior Publication Data
US 2024/0118075 A1     Apr. 11, 2024

(51) Int. Cl.
*G01B 11/30* (2006.01)
*G01B 11/06* (2006.01)
(Continued)

(52) U.S. Cl.
CPC .......... *G01B 11/30* (2013.01); *G01B 11/0625* (2013.01); *G01N 15/08* (2013.01);
(Continued)

(58) Field of Classification Search
CPC .... G01B 11/30; G01B 11/0625; G01N 15/08; G01N 15/0853; G06N 20/00; G06N 3/08
See application file for complete search history.

(56) References Cited

U.S. PATENT DOCUMENTS

2011/0276166 A1   11/2011   Atanasoff

FOREIGN PATENT DOCUMENTS

| DE | 19730975 A1 | 1/1999 | |
|---|---|---|---|
| DE | 10 2015 115 117 A1 | 2/2017 | |
| EP | 3124912 A1 * | 2/2017 | ............. G01B 11/06 |

OTHER PUBLICATIONS

Study'n'Learn, "IT: Switching on and off the computer", https://www.youtube.com/watch?v=gMwQ3-WEI60 Oct. 26, 2012 (Year: 2012).*

(Continued)

*Primary Examiner* — Maurice C Smith
(74) *Attorney, Agent, or Firm* — Maier & Maier, PLLC

(57) ABSTRACT

A method and an apparatus (15) for computer-implemented determination of physical properties of a porous layer (1) present on a surface of a substrate. The physical properties include at least a layer thickness (d) of the layer, a porosity (p) of the layer and a roughness (r) of the layer at an interface (9) with the substrate supporting the layer. The method includes recording a reflectance curve (39) concerning light (25) irradiated onto the porous layer within a wavelength range in which the porous layer is largely transparent, setting a predetermined roughness start value, setting a porosity start value based on knowledge concerning a manufacturing process for forming the porous layer, setting a layer thickness start value based on an evaluation of periodic fluctuations of reflectance intensities within the recorded reflectance curve, and determining the physical properties of the porous layer by computer-implemented fitting of the
(Continued)

recorded reflectance curve using a non-linear least squares method.

13 Claims, 2 Drawing Sheets

(51) Int. Cl.
  *G01N 15/08* (2006.01)
  *G01N 21/45* (2006.01)
  *G01N 21/55* (2014.01)
(52) U.S. Cl.
  CPC .............. *G01N 21/45* (2013.01); *G01N 21/55* (2013.01); *G01N 2015/0846* (2013.01); *G01N 2015/086* (2013.01)

(56) References Cited

OTHER PUBLICATIONS

International Search Report issued Sep. 17, 2021, in corresponding International Application No. PCT/EP2021/052129, partial translation included, 5 pages.

\* cited by examiner

METHOD FOR THE COMPUTER ASSISTED DETERMINATION OF PHYSICAL PROPERTIES OF A POROUS LAYER DISPOSED ON A SURFACE OF SUBSTRATE

FIELD

The present invention relates to a method by means of which physical properties such as, in particular, layer thickness, porosity and roughness of a porous layer present on a surface of a substrate may be advantageously determined. The invention further relates to an apparatus, a computer program product and a computer-readable medium storing the computer program product, by means of which the method may be executed or controlled.

BACKGROUND

For various technical applications, it may be necessary to deposit a porous layer on a surface of a substrate. Physical properties of this porous layer may then have an influence on, for example, optical properties, electrical properties, mechanical properties, etc. of a component formed with the help of the substrate. Such physical properties of the porous layer are, in particular, its layer thickness, its porosity and its roughness at an interface with the substrate supporting the layer.

For example, a technology is known by means of which solar cells or other microelectronic applications may be provided on the basis of substrates that may be produced very cheaply. A possible embodiment of such a technology for the production of solar cells is described, for example, in DE 197 30 975 A1. In this technology, a porous layer is produced on a surface of a substrate, in particular a semiconductor substrate or especially a silicon wafer. Where a silicon wafer is used as the substrate, the porous layer may be produced in the form of a porous silicon layer, for example by subjecting the silicon wafer to an etching process on its surface, in which pores are generated in the silicon wafer close to the surface. The porous layer may be formed as a single layer or as a stack of two or more sub-layers. A further layer, in particular a semiconductor layer, may subsequently be applied to the porous layer, for example by epitaxy. This further layer may then be separated from the substrate, the intermediate porous layer serving as a separating layer or predetermined breaking point. The additional, possibly very thin layer produced in this way may subsequently serve as a new substrate for a component, in particular a solar cell.

A quality of a new substrate formed in this way may be influenced in particular by a spatial homogeneity of the thickness and/or porosity of the porous layer.

Various conventional methods are known for determining physical properties of a porous layer produced on a substrate.

For example, a gravimetric method allows estimation of the porosity and thickness of a single porous layer on a substrate based on a measurement of the mass of the substrate before porosification, measurement of the mass of the substrate after porosification, and measurement of the mass of the substrate after removal of the porous layer. However, this method only provides spatially averaged values of the porosity and thickness. Furthermore, the method does not provide information about porous sub-layers of a stacked porous double layer. Moreover, this method typically suffers from significant inaccuracies and is destructive.

In contrast, reflectance or ellipsometry measurements at multiple locations of a porous layered substrate may provide spatial information about a thickness and/or porosity of a single or double porous layer and be non-destructive.

Ellipsometry techniques have been developed, but these require relatively flat substrate surfaces, ideally polished substrate surfaces, to provide reliable results. Consequently, such ellipsometry methods are often not very robust, especially in applications where sufficiently flat substrate surfaces are not available.

Therefore, reflectance methods are looked for in which measurements of an optical reflectance of light irradiated onto the porous layer are used to determine the physical properties of this layer. However, previous approaches adopted by such methods were often deficient. In particular, such previous approaches were often not very robust and/or required a great deal of equipment and/or time.

SUMMARY

A need has thus been recognized for an improved method for determining physical properties of a porous layer present on a surface of a substrate, in which, in particular, some of the aforementioned deficiencies are avoided or mitigated. In particular, a need has been identified for such a method which provides reliable results for the physical properties to be determined, may be implemented with relatively little equipment, may be carried out within a relatively short time, is non-destructive, may be carried out partly or fully automatically, allows spatial resolution with regard to the physical properties to be determined along the extent of the porous layer, and/or may be used for porous single layers as well as for porous double layers. A need has also been identified for an apparatus and/or a computer program product by means of which the method may be performed or controlled, and for a computer-readable medium with such a computer program product stored thereon.

Such a need may be met by the subject-matter of one of the independent claims. Advantageous embodiments are presented in the dependent claims, the following description and the Figures.

According to a first aspect of the invention, a method is described for computer-implemented determination of physical properties of a porous layer present on a surface of a substrate. The physical properties include at least a layer thickness of the layer, a porosity of the layer and a roughness of the layer at an interface with the substrate supporting the layer. The method comprises at least the following process steps, possibly, but not necessarily, in the order indicated:

Recording a reflectance curve concerning light irradiated onto the porous layer within a wavelength range in which the porous layer is largely transparent, Setting a predetermined roughness start value, Setting a porosity start value based on knowledge concerning a manufacturing process for forming the porous layer, Setting a layer thickness start value based on an evaluation of periodic fluctuations of reflectance intensities within the recorded reflectance curve, Determining the physical properties of the porous layer by computer-implemented fitting of the recorded reflectance curve using a non-linear least squares method based on the roughness start value, the porosity start value and the layer thickness start value.

According to a second aspect of the invention, an apparatus is described that is configured to perform or control embodiments of the method according to the first aspect of the invention.

According to a third aspect of the invention, a computer program product is described comprising computer-readable instructions which, when executed by a computer, direct the computer to perform or control the method according to an embodiment of the first aspect of the invention.

According to a fourth aspect of the invention, a computer readable medium is described on which a computer program product according to the third aspect of the invention is stored.

Possible features and advantages of embodiments of the invention may be regarded, inter alia and without limiting the invention, as being based on ideas and findings described below.

To summarize very briefly, an approach for embodiments of the method described herein may be to determine physical properties of a porous layer on a substrate surface by skillful analysis of reflectance properties of this porous layer including the underlying substrate surface. In particular, it has been recognized that a reliable, robust and fast method for determining the real physical properties of the porous layer may be provided by fitting a previously recorded reflectance curve using a specific class of approximation methods with regard to the physical properties influencing the reflectance curve, and selecting suitable start values for the physical properties in each case. Non-linear least squares methods, sometimes also referred to as non-linear least-squares error methods, have been identified as a suitable class of approximation methods. As starting parameters, such approximation methods may preferably be based on starting parameters for each of the physical properties to be determined, which may either be predetermined and derived, for example, from previous experience or basic assumptions and may be assumed to be constant, or which may be derived from knowledge about the manufacturing process used to form the porous layer. As a further alternative, starting parameters may be used which may be derived in a relatively simple and/or automated manner from the recorded reflectance curve.

More precise details of possible embodiments, features and advantages of embodiments of the method proposed herein are explained below.

The proposed method aims to determine physical properties of a porous layer disposed on the surface of a substrate.

The substrate may be a silicon substrate, in particular a silicon wafer. However, the substrate may also be made of another material, in particular a semiconductor material. The substrate generally has a thickness of more than 100 μm. The substrate is generally made of solid material, often crystalline, that is to say, monocrystalline, multicrystalline or polycrystalline.

The porous layer may be, but does not necessarily have to be, made of the same material as the substrate. The porous layer may in particular consist of a semiconductor material. The porous layer may in particular be a silicon layer in which a large number of small pores have been created by suitable treatment. The pores may have dimensions or diameters ranging from 2 nm or even less to 50 nm. The pores may be created, for example, by etching the silicon layer, in particular by anisotropic etching. Where appropriate, an etching step may be followed by a temperature step in which the substrate including the etched surface is kept at a temperature increased, for example, by several 100 K, so that a reorganization or geometric change of structures created during etching, such as etched channels, may take place so as to form pores of suitable size and/or shape.

Physical properties that may be determined are in particular those that influence an optical behavior of the porous layer and thus a reflectance behavior of the porous layer on the surface of the substrate. Such physical properties include, in particular, a layer thickness of the porous layer, a porosity of the porous layer and a roughness of the porous layer at an interface with the underlying substrate. In cases where the porous layer consists of a plurality of sub-layers, the physical properties may include the layer thicknesses and porosities of the respective sub-layers as well as the roughnesses at an interface with the substrate or with an adjacent sub-layer. In addition to optical behavior, the determined physical properties may also influence other properties of the porous layer, such as mechanical properties, electrical properties and the like.

The layer thickness of the porous layer may be understood as the distance between an outwardly exposed surface of the porous layer and an interface of the porous layer adjacent to the substrate. For many applications, porous layers may be used with a thickness in the range of a hundred or a few hundred nanometers (for example, between 100 nm and 900 nm) to a few micrometers (for example, less than 10 μm or less than 3 μm) or, in some cases, as much as a few 10 μm (for example, less than 50 μm).

The layer thickness influences the reflectance behavior of the porous layer in that parts of the irradiated light are reflected on the one hand from the surface of the porous layer and on the other hand from the interface between the porous layer and the substrate, leading to interference between the two reflectance elements. Because of this interference, the intensity of reflected light varies greatly depending on the wavelength of the light, as amplifying interference occurs for some wavelengths and weakening or even canceling interference for other wavelengths. In other words, positive, amplifying or negative, weakening interference may occur due to the superimposition of reflectance elements of parts of irradiated light reflected from the front and from the rear.

The porosity of the porous layer may be regarded as the ratio of a volume of all pores contained in a partial volume of the porous layer to the total partial volume. A large number of small pores may result in the same porosity as a small number of larger pores. In particular, the porous layer may be microporous or mesoporous.

The porosity may vary laterally along the porous layer. In particular, local inhomogeneities in the formation of the porous layer, caused for example by concentration fluctuations within an etching solution used for this purpose and/or inhomogeneities in the electric field, may lead to laterally varying porosity within the porous layer.

Also in the orthogonal direction, that is to say, in the direction of the thickness of the porous layer, porosity may vary within a layer, for example due to varying concentrations of the etching solution in the course of the etching process and/or due to varying electric fields within the substrate layer to be etched, which influence the etching process. However, the porosity typically varies only slightly in the orthogonal direction, that is to say, typically by less than 5% or even less than 1%.

However, applications are known in which the porosity in the orthogonal direction should preferably vary significantly in different areas of the porous layer compared to other areas of the porous layer. For this purpose, the porous layer may be formed from two or more sub-layers. Each individual sub-layer may be formed in a specific way, that is to say, for example with an etching solution specifically used for that purpose, so that a desired porosity is produced within it. In orthogonal directions, each of the sub-layers then has a porosity that typically varies only slightly. However, the porosities of adjacent sub-layers may differ considerably, for example by between 5% and 50%.

In general, the porosity of a layer influences its optical properties and thus also the reflectance behavior at the porous layer. In particular, an optical refractive index of the porous layer generally depends on its porosity.

The roughness of the porous layer at the interface with the substrate may be understood as a measure of the unevenness of the interface at the transition between the porous layer and the adjacent solid substrate. The roughness or unevenness may be determined or influenced by a size distribution, shape and/or arrangement of the pores present in the porous layer.

The roughness of the interface with the porous layer may, among other things, influence the intensity and/or directional dependence of reflectances at this interface. A higher roughness may lead to a more diffuse reflectance. Furthermore, both the roughness and the porosity may influence the interference with respect to light reflected from the porous layer in a complex way.

A previously recorded reflectance curve is analyzed in order to determine the above-mentioned physical properties of the porous layer. The reflectance curve here represents an intensity of light that is reflected from the porous layer and the underlying substrate when light is irradiated onto them. The light is irradiated with a known intensity and a known spectrum and the reflected light is detected using a detector. The reflectance curve indicates for each of a large number of wavelengths within a wavelength range the intensity with which the irradiated light is reflected, that is to say, what proportion of the irradiated light is reflected back to the detector. As previously mentioned, the reflectance curve is strongly influenced by the properties of the porous layer to be determined.

The reflectance curve may be recorded within a wavelength range in which the porous layer is largely transparent. In this context, "largely transparent" may be understood to mean that at most a negligible proportion of the incident light, for example less than 30%, preferably less than 15% and more preferably less than 5% of the incident light, is absorbed when it passes once through the porous layer.

Consequently, a predominant portion of the irradiated light reaches the interface between the porous layer and the substrate and may be partially reflected from this interface. As a result, interferences may occur between the light reflected from this interface and the light reflected from the surface of the porous layer, thereby significantly influencing the reflectance curve. Ultimately, information about the influencing physical properties, in particular the thickness of the porous layer, its porosity-dependent refractive index and its roughness, may be derived from the reflectance curve.

For example, in the case of a porous layer of silicon, a wavelength range with a lower limit of approximately between 500 nm and 600 nm and an upper limit of up to 2000 nm, preferably an upper limit of approximately between 1050 nm and 1200 nm, may be selected as a largely transparent wavelength range. This is based on the assumption that silicon begins to absorb light strongly at wavelengths below approximately 500 nm to 600 nm. At wavelengths above approximately 1050 nm to 1200 nm, silicon starts to become almost completely transparent to incident light, so that effects such as reflectance from a rear side of the silicon substrate may occur, which may interfere with reflectance measurements.

The reflectance curve may be recorded at the same time as or shortly before the method described herein is carried out, for example with a measuring device for measuring this reflectance curve that is coupled to or integrated into a device for carrying out the method described herein. Alternatively, the reflectance curve may have been recorded at an earlier time, stored in the interim and then read from a memory, for example, only when the method described herein is carried out.

To analyze the reflectance curve and determine the desired physical properties from it, the recorded reflectance curve is fitted with computer assistance using a non-linear least squares method. For this purpose, reflectance properties of the porous layer are modeled taking into account its physical properties in such a way that a curve of wavelength-dependent reflectance properties calculated in this way approaches or approximates the actually recorded reflectance curve, that is to say, fits the reflectance curve.

It has been recognized that, among various known approximation methods or algorithms used for fitting, the least squares methods represent a suitable option for deriving reliable statements about the physical properties of the porous layer by fitting the actual reflectance curve. In particular, it has been recognized that, among the many known least squares methods, the non-linear least squares methods in particular appear suitable for obtaining such reliable statements. In such non-linear methods, parameters are entered non-linearly into a function so that, in principle, data may be fitted to any equation of the form y=f(a). Since such equations define curves, the terms "curve fitting" and "non-linear regression" are often used synonymously.

An optical model for fitting a reflectance curve (sometimes also referred to as a reflectance spectrum) may be based on a transfer matrix method, where each layer is described by its thickness and optical refractive index, and each interface between two layers is described by its roughness and the optical refractive indices within two adjacent regions at the interface. To calculate or estimate a refractive index of a porous layer, the porous layer may be modeled, for example, by a so-called Bruggemann approximation as a mixture of solid material and gas bubbles enclosed therein in a ratio P corresponding to the porosity of the porous layer. In a high wavelength range in which silicon, for example, is at best weakly absorbent, portions of a light beam reflected at the various surfaces and interfaces of the porous layer interfere, leading to oscillations in the reflectance curve. A period of such oscillations is generally quasi-inversely proportional to a layer thickness of the porous layer. An average level and amplitude of oscillations are mostly influenced in a complex way by the roughness and porosity of the porous layer.

In order to fit the recorded reflectance curve using a non-linear least squares method, the method typically starts with assumed start values for the parameters that correspond to the physical properties to be determined. Beginning with these start values, the parameters are then varied so as to obtain a best possible match between a fit curve calculated in this way and the actual reflectance curve.

It has been recognized that the choice of suitable start values may have a significant influence on a quality of the finally approximated parameters of the physical properties to be determined. In particular it has been observed that, although the choice of suitable start values may be less critical when using non-linear least squares methods compared to other approximation methods, the quality of the finally approximated parameters may still depend significantly on how close the start values initially were to the actual parameters of the physical properties to be determined. In other words, it has been observed that a non-linear least squares algorithm often converges reliably only when the start values are very close to the actual values looked for.

With previous approaches, it was usually considered a challenge to select suitable start values for the various physical properties to be determined. These were frequently selected using a trial and error approach. This could be very time-consuming. It could also require some experience in the case of a user employing the approximation method in order to obtain sufficiently accurate information regarding the physical properties to be determined. Furthermore, the physical properties to be determined may vary significantly along a lateral extent of the porous layer, so that a set of parameters once found that leads to satisfactory results in the approximation method at one position of the porous layer does not necessarily also work satisfactorily at other positions of the porous layer. This also made previous approaches to using approximation methods more difficult and, in particular, time-consuming and demanding in terms of user experience.

In addition to a skillful choice of the non-linear least squares method as an approximation method, the targeted setting of start values for the individual physical properties in the method proposed here also enables high reliability and accuracy of the results finally obtained for the physical properties to be determined.

A predetermined value may be selected in a simple manner as the start value for roughness (hereinafter referred to as the roughness start value). The predetermined roughness start value may have been determined based on prior experience, experiments, calculations, simulations or other knowledge available beforehand. The predetermined roughness start value may have been determined independently of knowledge about the specific substrate and/or independently of knowledge about the specific porous layer or about its production. In particular, the predetermined roughness start value may be assumed to be zero in many cases, at least as a rough approximation.

The roughness start value may preferably be set automatically. That is to say, in general, no user input need be required to set the roughness start value using the method proposed herein. Nor is any special expertise generally expected, for example, of a user wishing to use the method proposed herein to set the roughness start value.

The start value for porosity (hereinafter referred to as the porosity start value) may be a value chosen based on knowledge of the manufacturing process by which the porous layer was formed. For example, it may be known that the porous layer has been created in such a way that it typically has a certain porosity. The porosity may depend on different manufacturing parameters. For example, a porous layer produced by etching may be influenced in terms of its porosity by a concentration of the etching solution used, an applied current or voltage, a duration of the etching process, a temperature prevailing during the etching process, properties of the substrate to be etched, properties of post-treatment steps such as, in particular, a subsequent heat treatment to reorganize etching structures that have been created, etc. From a knowledge of the manufacturing parameters for forming the porous layer, it is thus possible to make at least a rough estimate of the actual porosity of this layer and adopt this as the porosity start value.

To set the porosity start value, a user using the method proposed herein may need to enter one or more details regarding the manufacturing process for the porous layer. However, the user is not usually expected to have in-depth knowledge of the manufacturing process. For example, it may be sufficient to take the information to be entered from a reference book or table. It may also be possible to set the porosity start value automatically, for example by providing information about the manufacturing process automatically, for example from other equipment used in the production process.

The start value for layer thickness (hereinafter referred to as the layer thickness start value) may be a value selected based on an evaluation of periodic fluctuations of reflectance intensities within the recorded reflectance curve. As explained above, positive and negative interferences lead to periodic fluctuations, that is to say, oscillations, within the reflectance curve recorded at the porous layer. In particular, a periodicity of these fluctuations is significantly influenced by the thickness of the porous layer. By evaluating the periodic fluctuations in the reflectance curve, it is possible to estimate a good start value for this layer thickness which is already very close to the real layer thickness of the porous layer.

For example, a wavelength interval between two neighboring wavelengths within the reflectance curve at which the periodic fluctuations of the reflectance curve each reach an extremum, that is to say, for example, a maximum or minimum, may be determined for this purpose. The layer thickness start value may then be mathematically derived from this wavelength interval, since such extrema are mainly dependent on the layer thickness of the porous layer and its refractive index.

This layer thickness start value may be determined fully or largely automatically, as the periodic fluctuations within the reflectance curve may be read and evaluated automatically.

With embodiments of the method described herein, suitable start values may generally be set in an automated and robust fashion in order to determine physical properties of a single porous layer. When determining the physical properties of porous double layer structures, embodiments of the method described herein generally enable setting suitable start values within a wider range. The various start values may be set at least partially automatically. This allows successful fitting and thus determination of the physical properties of the porous layer, requiring at most minimal intervention and/or knowledge on the part of a user of the method. In addition, a wider range of parameter combinations and variations within a substrate may be covered.

According to one embodiment, a Levenberg-Marquardt algorithm or a trust region method, in particular a trust region reflective method, may be used as the non-linear least squares method.

The Levenberg-Marquardt algorithm is a numerical optimization algorithm for solving non-linear balancing problems using the least squares method. It has been observed that, when using the Levenberg-Marquardt algorithm to fit the captured reflectance curve, relatively high robustness may be achieved compared to other algorithms, that is to say, the algorithm converges with high probability even under relatively poor starting conditions.

The trust region methods or, in a special embodiment, the trust region reflective methods or procedures are a class of robust and efficient globalization strategies for the numerical calculation of a local minimum of a possible non-convex, uniquely continuously differentiable function. The trust region methods are closely related to the Levenberg-Marquardt algorithm, but differ significantly in terms of the quadratic sub-problems to be solved. With use of a trust region method, similar to a Levenberg-Marquardt algorithm, a relatively high level of robustness may be achieved compared to the use of other algorithms when fitting the recorded reflectance curve. In addition, trust region methods may advantageously allow limits to be set on parameters, which is typically not the case with the Levenberg-Marquardt algorithm.

According to one embodiment, the reflectance curve may comprise measured reflectance values at the porous layer at wavelength intervals of less than 30 nm, preferably less than 20 nm, 10 nm or even 5 nm.

It has been recognized as advantageous to capture the reflectance curve with a high resolution in terms of the measured reflectance values it contains. In particular, it has been recognized that an interval, in terms of the neighboring wavelengths at which reflectance measurements have been made in order to ultimately obtain the full reflectance spectrum, should preferably be kept relatively short, in particular less than 30 nm or 20 nm and possibly less than 10 nm or 5 nm. On the one hand, this increases the number of reflectance measurements to be performed in order to determine the whole reflectance curve, which may increase an effort required to record the reflectance curve. On the other hand, however, it has been observed that a reflectance curve captured with high resolution may provide better results when subsequently determining the physical properties of the porous layer by fitting this reflectance curve. In particular, it is assumed that a high resolution of the reflectance curve may help when evaluating periodic fluctuations of reflectance intensities within the reflectance curve and thereby support fitting of the reflectance curve and/or finding a suitable setting of the layer thickness start value.

According to one embodiment, in the proposed method, in addition to the layer thickness start value, a smaller layer thickness start value which is less than 20%, preferably less than 10% smaller than the layer thickness start value, and a larger layer thickness start value, which is less than 20%, preferably less than 10% larger than the layer thickness start value, may be set. The recorded reflectance curve may then be fitted by repeated computer-implemented fitting using the non-linear least squares method starting from the roughness start value, the porosity start value and one of a plurality of values from the group comprising the layer thickness start value, the smaller layer thickness start value and the larger layer thickness start value. The physical properties of the porous layer may ultimately be determined based on a best fit result found during the repeated computer-implemented fitting process.

It has been observed that, in general, the closer the assumed layer thickness start value is to the actual layer thickness of the porous layer, the more accurate and reliable are the results obtained for the physical properties obtained by fitting the reflectance curve. Therefore, in difficult cases where, for example, measurement errors, non-ideal behavior of the porous layer, unsuitable assumptions regarding the porosity of the porous layer or similar lead to a situation where fitting the reflectance curve does not produce satisfactory results, it is suggested that, in addition to the layer thickness start value, which is set based on the evaluation of the periodic fluctuations of reflectance intensities within the recorded reflectance curve, two further layer thickness start values are set, which are respectively slightly below and slightly above the first-mentioned layer thickness start value. The computer-implemented fitting of the reflectance curve is then carried out three times, each time using one of these three layer thickness start values.

The same roughness start value and the same porosity start value may be used in each case. Finally, the results from all three fitting processes or the quality of the fits determined in each case are compared with each other and the physical properties of the porous layer are determined based on the best fit result. Such an approach makes the overall procedure significantly more robust, resulting in higher reliability and/or accuracy of the determined physical properties.

The explanations given above generally concern the determination of physical properties of a porous layer, the porous layer being formed in particular as a single layer, that is to say, with substantially uniform porosity across the layer thickness.

Embodiments of the method presented herein are explained below, whereby, in particular, physical properties of a porous layer formed as a double layer may be determined.

According to one embodiment, the porous layer comprises a first sub-layer and a second sub-layer and the physical properties include at least:
 a layer thickness of the first sub-layer,
 a porosity of the first sub-layer,
 a roughness of the first sub-layer at an interface with a substrate supporting the layer,
 a layer thickness of the second sub-layer,
 a porosity of the second sub-layer,
 a roughness of the second sub-layer at an interface with the first sub-layer.

In other words, when determining the physical properties of a double layer, a total of six parameters must be approximated and suitable start values set for each of the six parameters, whereas for a single layer generally only three parameters need to be considered. On the one hand, the larger number of parameters requires greater effort to fit the reflectance curve, but on the other hand also enables the determination of physical properties of porous layers that may be used advantageously for practical applications and are made up of two sub-layers, each with different porosities.

It has been recognized that, despite the greater complexity of such a problem involving six parameters, a method of determining the physical properties of a porous double layer may be provided that may be largely automated and requires little expertise on the part of a user. Among other things, it may be necessary to set the start values for each of the parameters skillfully and/or in a suitable order.

According to one embodiment, the method comprises the following steps:
 Setting a predefined first roughness start value and a predefined second roughness start value,
 Setting a first porosity start value and a second porosity start value, each based on knowledge of a manufacturing process for forming the porous layer,
 Setting a first layer thickness start value relating to a thicker of the first and of the second sub-layers based on an evaluation of periodic fluctuations with a smallest fluctuation period of reflectance intensities within the recorded reflectance curve,
 Setting a second layer thickness start value relating to a thinner of the first and second sub-layers,
wherein, in a first step of the method, a first thickness and a first porosity of the thicker of the first and second sub-layers are determined by computer-implemented fitting of the recorded reflectance curve using the non-linear least squares method based on the first and second roughness start values, the first and second porosity start values and the first and second layer thickness start values.

In other words, the roughness start values for both sub-layers are set as predefined values in a similar way to that described earlier. In particular, as a first approximation these roughness start values may initially be set to zero.

The porosity start values for the two sub-layers may also be set in a similar way to that described above based on knowledge of the porous layer derived from the method whereby its sub-layers were produced.

When setting the start values for the layer thicknesses of the two sub-layers, a different approach is chosen compared to a porous single layer. Here, account is taken of the fact that, in the case of a single layer, reflectances only occur at its front surface and its rear interface with the substrate and superimpose each other, whereas in the case of a double layer, reflectances also occur at an interface between the two sub-layers and superimpose with the other two reflectances. Resulting interferences lead to oscillations with at least two different periodicities being superimposed on each other in the resulting reflectance curve. Periodic fluctuations with a smallest fluctuation period are caused by interferences resulting from reflectances on the front and rear sides of a thicker of the two sub-layers. Periodic fluctuations with a larger fluctuation period result from interferences arising from reflectances on the front and rear sides of the thicker of the two sub-layers.

Since, among other things, the periodic fluctuations with the smaller fluctuation period in the reflectance curve are easier to recognize and evaluate, the layer thickness start value for the thicker sub-layer is set based on an evaluation of these periodic fluctuations. Herein, extrema in the reflectance curve may be recognized and analyzed in a similar way to that explained above.

The layer thickness start value of the thinner layer may be set in a different way. For example, the second layer thickness start value may be set based on knowledge regarding a manufacturing process for forming the thinner sub-layer. For example, process parameters used in the production of the thinner sub-layer, such as the type and concentration of the etching solution, an applied current or voltage, an etching time, prevailing temperatures, etc., may be used to draw conclusions about the probable layer thickness of the thinner sub-layer and, based on this, set an layer thickness start value for this sub-layer.

After the start values for the various parameters have been set as described, the physical properties of the porous double layer may be determined. In particular, these properties may be determined successively, that is to say, preferably in a plurality of successive steps.

Therein, in a first step, the first thickness and the first porosity of the thicker sub-layer may be determined by computer-implemented fitting of the reflectance curve, starting from the previously set first and second roughness start values, porosity start values and layer thickness start values.

It has been observed that, by successfully fitting the periodic fluctuations with the fastest oscillation, that is to say, with the smallest fluctuation period, a sufficiently small fit error may already be achieved in many cases, independent of the values of the other parameters.

According to a further specified embodiment, in a second step of the method a second thickness and a second porosity of the thinner of the two sub-layers may then be determined by computer-implemented fitting of the recorded reflectance curve using the non-linear least squares method. In this case, fitting may be carried out on the basis of a first layer thickness start value and a first porosity start value, which are derived from fit results of the preceding first step of the method.

In other words, in the second step, the thickness and porosity may be fitted for the thinner of the two sub-layers alone, assuming start values for the thicker of the sub-layers which are taken from the preceding first step of the method.

It has been observed that in many cases this already provides sufficiently accurate and reliable results for physical properties of this thinner sub-layer.

According to a further specified embodiment, in a third step of the method a first roughness of the thicker sub-layer and a second roughness of the thinner sub-layer may then be determined by computer-implemented fitting of the recorded reflectance curve using the non-linear least squares method. In this case, fitting may be carried out on the basis of first and second layer thickness start values and first and second porosity start values, which are derived from fit results of the preceding first step and the preceding second step of the method.

In other words, in the third step, mainly the roughnesses for the two sub-layers may be determined by computer-implemented fitting, the results from the previous two process steps being assumed for the layer thicknesses and porosities of the two sub-layers.

It has been observed that, in many cases, this already provides sufficiently accurate and reliable results for the roughnesses.

According to a further specified embodiment, in a fourth step of the method, all of the physical properties of the first and second sub-layers may then be determined by computer-implemented fitting of the recorded reflectance curve using the non-linear least squares method. In this case, fitting may be carried out on the basis of first and second layer thickness start values, first and second porosity start values and first and second roughness start values which are derived from fit results of the preceding first step, the preceding second step, and the preceding third step of the method.

It has been recognized that even more accurate and/or reliable results may be obtained overall for the physical properties to be determined by re-determining, in a final fourth step, all of the physical properties of both sub-layers by fitting the reflectance curve and using, for each of the start values, the respective value that was obtained for the parameter concerned in one of the preceding steps.

All in all, with the aid of the plurality of steps using the method described, the physical properties of a porous double layer may be determined sufficiently precisely and reliably.

It should further be noted that embodiments of the method presented herein may also be used to determine physical properties of triple layers, or multiple layers in general, provided that certain conditions are met. For example, physical properties of a triple layer may often be satisfactorily determined by fitting a reflectance curve, provided that the third sub-layer is very thin compared to the other two sub-layers. In this case, the third sub-layer may be regarded as a kind of roughness for one of the other two sub-layers lying adjacent to it. In an alternative scenario, where the third sub-layer has a similar thickness to one of the other sub-layers, for example the low-porosity sub-layer, the algorithm may assume a very thick common layer with an averaged porosity and fit the reflectance curve accordingly. Even in the case of a so-called Bragg reflector, which is made up of a large number of pairs of porous sub-layers of different porosity, of which it is known approximately how thick and how porous they are and how many series have been etched, satisfactory statements about the physical properties of the individual porous layers may be determined in many cases with the aid of the method proposed herein. The six parameters obtained in this way may need to be interpreted.

According to one embodiment, the physical properties may be determined in a plurality of successive runs of the method at a plurality of positions along the surface of the substrate. The physical properties may be determined at a second and subsequent instances of the plurality of positions by computer-implemented fitting of the recorded reflectance curve using a non-linear least squares method, with fitting being carried out based on first and second layer thickness start values, first and second porosity start values, and first and second roughness start values derived from fit results of a previous run of the method performed at a respective neighboring position.

In other words, the physical properties of a porous layer may be determined not only at one position or as properties averaged over the layer. Instead, these physical properties may be determined at many different positions of the porous layer, so that ultimately a kind of "map" may be created, in which a spatial distribution of the physical properties of the porous layer may be represented.

Therein, the physical properties at a first position may be determined in a manner as described in detail above. The physical properties at neighboring positions may then be determined in a similar way by fitting the reflectance curves recorded there. However, in order to set the various start values, it is no longer necessary to make the assumptions or evaluations that were necessary during the run of the method relating to the first position. Instead, in these subsequent runs of the method, the associated results from a previous run of the method, which was carried out for a neighboring position, may be adopted as the start values in each case.

This is based on the consideration that typically neither the layer thickness, nor the porosity nor the roughness of a porous layer change by very much laterally along the porous layer over short distances. Hence, it may be assumed that the porous layer will have roughly similar physical properties at one position to those existing at a neighboring position whose physical properties have been determined previously. The physical properties determined in the previous run of the method may thus be advantageously set as the start values in a subsequent run of the method. In this way, accurate, reliable and/or fast convergence may be achieved when fitting the local reflectance curve.

In particular, when used to determine physical properties of a porous double layer, a rough estimate of the porosity of both sub-layers and of the thickness of the thinner of the two sub-layers is thus usually sufficient to enable successful fitting of a first reflectance curve at a first position of the porous layer. The parameter values obtained are then generally good enough to successfully serve as start values, that is to say, initial fit parameters, when determining physical parameters for neighboring positions using subsequent runs of the method. This makes it possible to generate an entire "map" for properties of the porous layer, preferably without the need for further user intervention.

Using only basic and imprecise information about an examined stack of layers (for example, based on knowledge of processing of the layers), embodiments of the method described herein may enable even an inexperienced user to successfully fit measured reflectance curves on a single wafer in a quasi-automatic manner and thereby obtain information about the physical properties of a porous layer. The proposed method has proven highly robust even with variations in the layering process and global properties of the stack. This enables even an inexperienced user to easily and reliably determine spatially resolved maps of a layer thickness, a porosity and a roughness for single and double porous layer systems.

According to the second aspect of the invention, an apparatus is presented that is configured to perform or control embodiments of the method described above. For this purpose, the apparatus may have, among other things, a processor for data processing, a memory for data storage and/or one or more interfaces for data input or data output. The processor may be controlled by a computer program. The processor and/or computer program may be configured, in particular, to perform the steps of setting the different start values and fitting the recorded reflectance curve by executing the non-linear least squares method. Via the interfaces, for example, data may be read that represents the reflectance curve, or data may be output that represents the determined physical properties of the porous layer. Data representing the reflectance curve, for example, may be stored in the memory.

According to one embodiment, the apparatus may further comprise a measuring device for measuring the reflectance curve to be recorded using the method. In other words, a measuring device, with the help of which reflectance measurements may be carried out on the surface of a substrate and an evaluation device, with the help of which measured reflectance curves may be evaluated in the manner described herein, may be integrated in a common apparatus. The measuring device may have a tunable light source for this purpose in order to direct a light beam with a desired spectrum onto the surface of the substrate. The light source may be configured to direct the light beam onto the substrate surface at different positions, that is to say, to scan the substrate surface. Furthermore, the measuring device may have a light detector to detect light reflected from the substrate surface. Signals from the light detector may then form a reflectance curve to be detected and may be transmitted to the evaluation device.

According to one embodiment of the third aspect of the invention, a computer program product comprises computer-readable instructions to direct a computer to perform or control embodiments of the method described herein. Here, the computer may be understood as part of an apparatus according to the second aspect of the invention. The computer program product may be written in any computer language. As software, the computer program product may interact in a suitable manner with hardware of the computer in order to implement a desired functionality.

According to one embodiment of the fourth aspect of the invention, the described computer program product is stored on a computer-readable medium. The computer-readable medium may be any medium from which a computer may read data. For example, the computer-readable medium may be a CD, DVD, flash memory, ROM, PROM, EPROM or similar. In particular, the computer-readable medium may be portable. Alternatively, the computer-readable medium may also be part of a separate computer, in particular part of a server or data cloud from which the computer program product may be downloaded via a data network such as the Internet.

It is pointed out that possible features and advantages of embodiments of the invention are described herein partly with reference to a method according to the invention and partly with reference to an apparatus according to the invention. A person skilled in the art will recognize that the features described for individual embodiments may be transferred, adapted and/or interchanged in an analogous and suitable manner to other embodiments in order to arrive at further embodiments of the invention and possibly realize synergistic effects.

BRIEF DESCRIPTION OF THE DRAWINGS

Advantageous embodiments of the invention are further explained below with reference to the accompanying drawings, in which neither the drawings nor the explanations are to be construed as limiting the invention in any way.

The figures are merely schematic and not to scale. Identical reference signs in the different drawings denote identical or identically acting features.

DETAILED DESCRIPTION

Figure 1:
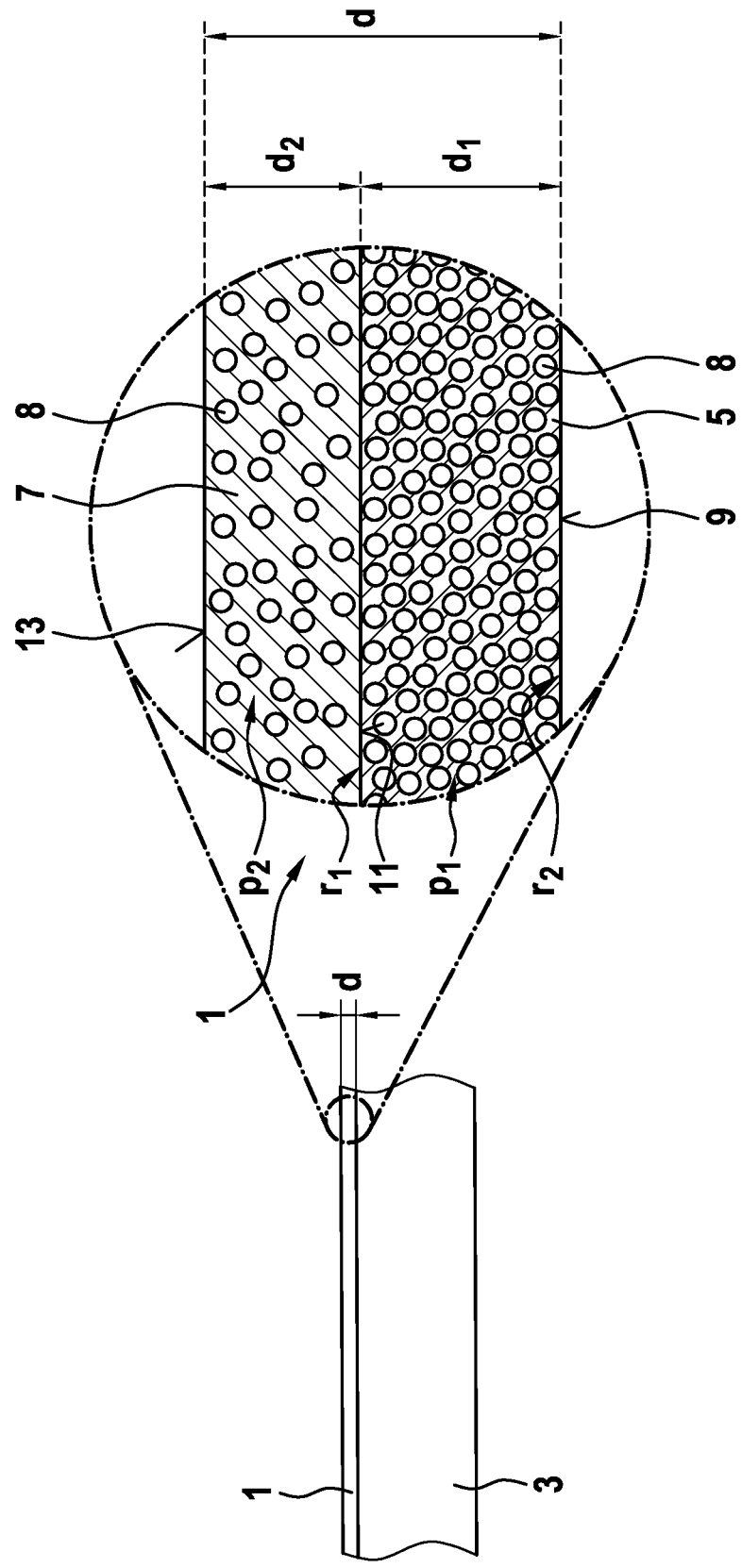
FIG. 1 shows a porous layer on a substrate whose physical properties may be determined according to an embodiment of the present invention.

FIG. 1 shows an example of a porous layer 1 located on a surface of a substrate 3. The substrate 3 may be a silicon wafer. The porous layer 1 may have been created by anisotropic etching and subsequent heat treatment of the silicon wafer. The porous layer 1 has a layer thickness d in the range of a few 100 nm to a few micrometers.

As shown in the enlarged view in FIG. 1, the porous layer 1 may be composed of a double layer consisting of a first sub-layer 5 and a second sub-layer 7. The first sub-layer 5 has a layer thickness $d_1$ which may be considerably greater than a layer thickness $d_2$ of the second sub-layer 7. In the example shown, the first sub-layer 5 has a significantly higher porosity $p_1$ than the porosity $p_2$ of the second sub-layer 7. This higher porosity is due to the fact that the first sub-layer 5 contains significantly more and/or significantly larger pores 8 than the second sub-layer 7. The first sub-layer 5 may therefore also be described as highly porous and the second sub-layer 7 as low porous. At an interface 9 with the substrate 1, the first sub-layer 5 has a roughness $r_1$. At an interface 11 between the first sub-layer 5 and the second sub-layer 7, the second sub-layer 7 has a roughness $r_2$. A surface on the opposite side to the interface 11 forms an exposed surface 13 of the porous layer 1.

Figure 2:
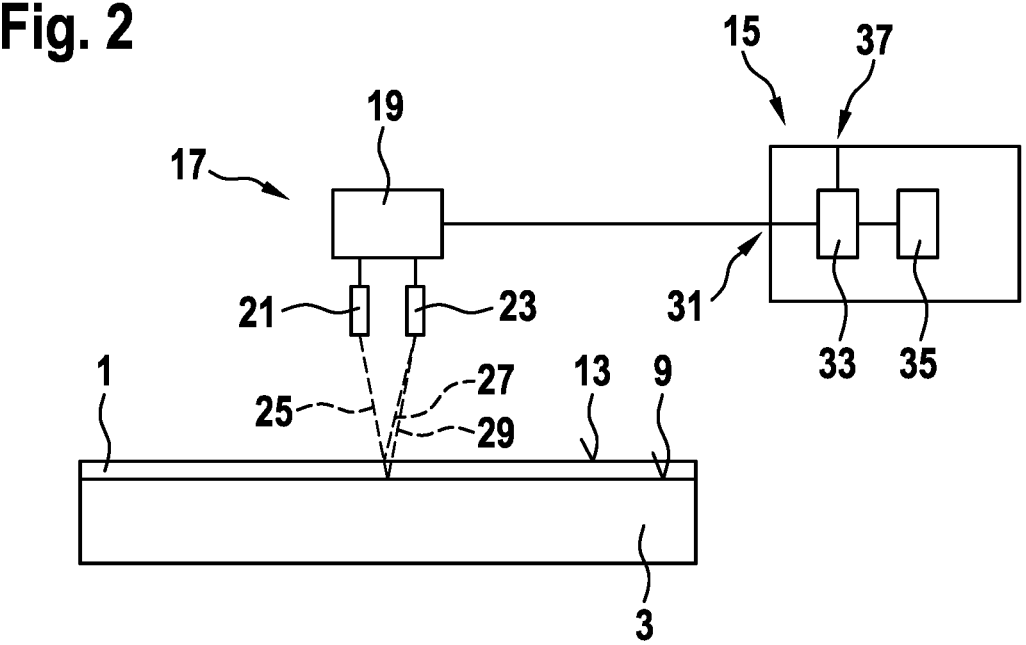
FIG. 2 shows an apparatus for determining physical properties of a porous layer according to an embodiment of the present invention.

FIG. 2 is a highly schematized illustration of a possible apparatus 15 which may be used to determine physical properties such as the layer thicknesses d, the porosities p and the roughnesses r of a porous layer 1. The apparatus 15 is configured to evaluate a reflectance curve, that is to say, a spectrum of light reflected from the porous layer 1 and the substrate 3. Such a reflectance curve may be recorded, for example, with the aid of a reflectance measuring device 17 coupled to the apparatus 15.

For this purpose, the reflectance measuring device 17 has a control unit 19, a light source 21 and a light detector 23. The light source 21 is tunable. The control unit 19 may control the light source 21 with regard to the light spectrum emitted by it. The light source 21 then emits a light beam 25 with a narrow-band light spectrum. For example, a half-width of this light spectrum may be less than 50 nm or even less than 20 nm. The light beam 25 then strikes the porous layer 1 and is reflected partly from its exposed surface 13, partly from its interface 9 with the substrate 3 and, where the porous layer 1 is formed as a double layer, partly from the interface 11 between the two sub-layers 5, 7.

Figure 3:
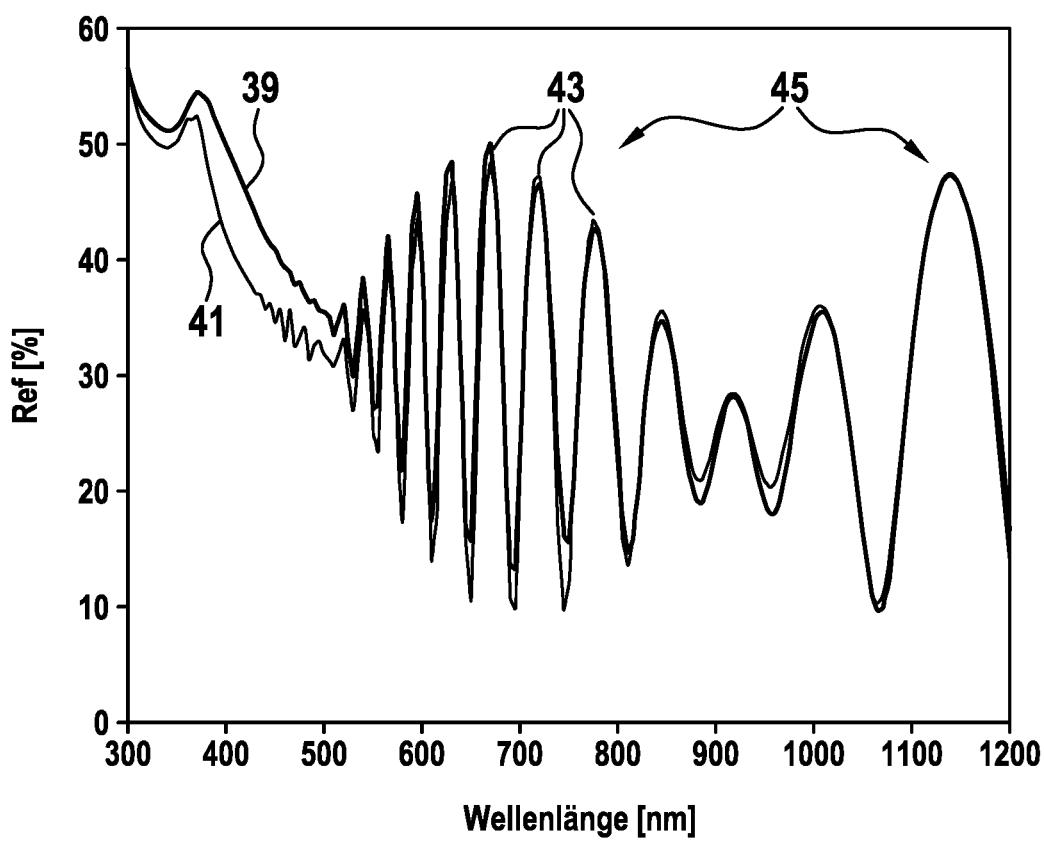
FIG. 3 illustrates a reflectance curve which may be used to determine physical properties of a porous layer according to an embodiment of the present invention.

Reflected portions 27, 29 of the irradiated light beam 25 may superimpose and interfere with each other before they strike the light detector 23 and are detected by it. The intensity of the detected light greatly depends on the way in which the two reflected portions 27, 29 interfere positively or negatively with each other. The type and strength of the interference depends on the one hand on the wavelength of the irradiated light beam 25 and on the other hand on the layer thickness d of the entire porous layer 1 or the individual layer thicknesses $d_1$ and $d_2$ of the two sub-layers 5, 7 and the refractive index or refractive indices within the porous layer 1. The refractive indices in turn depend on the porosities $r_1$, $r_2$. A ratio between an intensity of the irradiated light beam 25 and an intensity of the reflected light indicates the reflected portion Ref in percent. A spectrum in which the reflected portion Ref is indicated as a function of the wavelength of the irradiated light beam 25 is referred to herein as a reflectance curve 39. FIG. 3 shows an example of such a reflectance curve 39.

With the help of the reflectance curve 39, the apparatus 15 may then determine the physical properties of the porous layer 1 to be determined in a largely automated manner. For this purpose, the apparatus 15 has an input interface 31 via which it may receive data representing the reflectance curve 39 from the reflectance measuring device 17. This data may then be processed by a processor 33 and, where appropriate, temporarily stored in a memory 35. Finally, the results determined in the processor 33 may be output via an output interface 37.

First, a method is described by way of example with which the physical properties of a porous layer 1 in the form of a single layer may be determined. The physical properties include the layer thickness d, the porosity p of the porous layer 1 and the roughness r at the interface 9 with the substrate 3.

First, start values are defined for each of these three parameters. As, based on experience, the least critical of the three parameters, the roughness start value may be set to a fixed predetermined value. For example, the roughness start value may be set to 0, as this yields a maximum signal amplitude and thus allows optimal identification of the shape of signals in the reflectance curve 39. For the porosity start value, a value may be used that is estimated on the basis of knowledge regarding the preceding production of the porous layer 1. To set the layer thickness start value, periodic fluctuations of reflectance intensities within the recorded reflectance curve 39 may be evaluated. For this purpose, for example, positions of maxima 43 and/or minima of the interference oscillations may be detected within the captured reflectance curve 39, so that, assuming that the porosity start value has been set at least roughly correctly, a relatively correct estimation of the layer thickness may be determined on this basis by means of a suitable linear fit.

After the various start values have been suitably set, the actual physical properties of the porous layer 1 are determined by computer-implemented fitting of the recorded reflectance curve 39. In this fitting process, a fit curve 41 is calculated using a non-linear least squares method, preferably a trust region method or a Levenberg-Marquardt algorithm. An approximation process to determine the fit curve 41 starts at the previously set start values. A fit curve 41 that best matches the actual reflectance curve 39 is generated with fit parameters that best reflect the real physical properties of the porous layer 1.

In difficult cases where, for example, measurement errors, non-ideal behavior of the porous layer 1, inaccurate assumptions regarding the porosity or other factors make it difficult to determine the physical properties, additional start values may be set for the various physical properties. In particular, additional sets of start values may be set where a smaller layer thickness start value is around 10% or 20% smaller than the previously determined layer thickness start value and a larger layer thickness start value is around 10% or 20% larger than this previously determined layer thickness start value. An approximation of the reflectance curve 39 may then be carried out with all three sets of start values. The actual physical properties of the layer 1 may then be determined with a high degree of reliability from the fit curve 41 that best matches the real reflectance curve 39.

Next, a version of the method described herein is exemplified in which the porous layer 1 is formed as a double layer. Each of the two sub-layers 5, 7 is characterized by its layer thickness, its porosity and its roughness. The reflectance curve 39 recorded for the double layer must therefore be fitted with six parameters starting from the six associated start values.

In the case of the reflectance curve 39 for a double layer, it may be assumed that the fastest oscillations in the spectrum, that is to say, periodic fluctuations in the reflectance curve 39 with the smallest fluctuation period, are caused by interference of reflectance elements on the thicker of the two partial layers 5, 7. The fast oscillations may be recognized, for example, by their closely spaced maxima 43. These fast oscillations are modulated by slower oscillations induced by the other, thinner sub-layer 7, 5. The slower oscillations may be recognized by a beat 45 within the reflectance curve 39.

The physical properties of the double-layered porous layer 1 may be determined in a plurality of steps.

In a first step, only the layer thickness and porosity of the thicker of the two sub-layers 5, 7 are fitted based on the smaller oscillation period within the reflectance curve 39, the other parameters being kept constant at their start values. The start value for the layer thickness of this thicker sub-layer is determined in a similar way to that described for a single layer. Successful fitting of the period of the fastest oscillations already allows a limited fit error independent of the values of the other parameters.

In a second step, only the thickness and porosity of the thinner of the two sub-layers are fitted. Therein, the layer thickness and porosity values for the thicker sub-layer determined by fitting in the first step are used.

In a third step, the layer thickness and porosity values determined in the previous two steps for the two sub-layers are used to then fit the two roughnesses, that is to say, the roughness at the boundary layer 9 with the substrate 3 and the roughness at the boundary layer 11 between the two sub-layers 5, 7 (for example with a starting value of 0).

In a final fourth step, the parameter values found in the previous three steps are used as start values in a fitting of all six parameters.

Finally, it should be noted that terms such as "having", "comprising", etc. do not exclude other elements or steps, and terms such as "one" or "a" do not exclude a plurality. It should further be noted that features or steps that have been described with reference to one of the above embodiments may also be used in combination with other features or steps of other embodiments described above. Reference signs in the claims are not to be considered as limitations.

LIST OF REFERENCES

1 Porous layer
3 Substrate
5 First sub-layer
7 Second sub-layer
8 Pores
9 Interface with the substrate
11 Interface between first and second sub-layers
13 Exposed surface of the porous layer
15 Apparatus for determining properties of porous layers
17 Reflectance measuring device
19 Control unit
21 Light source
23 Light detector
25 Emitted light beam
27 First reflected light beam portion
29 Second reflected light beam portion
31 Input interface
33 Processor
35 Memory
37 Output interface
39 Reflectance curve
41 Fit curve
43 Maxima of fast oscillations
45 Beat

The invention claimed is:

1. A method for computer-implemented determination of physical properties of
a porous layer present on a surface of a substrate,
wherein the physical properties comprise at least:
a layer thickness of the layer,
a porosity of the layer, and
a roughness of the layer at an interface with the substrate supporting the layer,
the method comprising:
detecting a reflectance curve concerning light irradiated onto the porous layer within a wavelength range in which the porous layer is largely transparent, setting a predetermined roughness start value, setting a porosity start value based on knowledge concerning a manufacturing process for forming the porous layer,
setting a layer thickness start value based on an evaluation of periodic fluctuations of reflectance intensities within the detected reflectance curve, and determining the physical properties of the porous layer by computer-implemented fitting of the detected reflectance curve using a non-linear least squares method based on the roughness start value, the porosity start value and the layer thickness start value.

2. The method according to claim 1,
wherein a Levenberg-Marquardt algorithm or a trust region method is used as the non-linear least squares method.

3. The method according to claim 1,
wherein the reflectance curve comprises measured values of the reflectance at the porous layer at wavelength intervals of less than 30 nm.

4. The method according to claim 1,
wherein, in addition to the layer thickness start value, a smaller layer thickness start value which is less than 20% smaller than the layer thickness start value, and a larger layer thickness start value, which is less than 20% larger than the layer thickness start value, are set, the detected reflectance curve being fitted by repeated computer-implemented fitting using the non-linear least squares method starting from the roughness start value, the porosity start value and one of a plurality of values selected from the group comprising the layer thickness start value, the smaller layer thickness start value and the larger layer thickness start value, the physical properties of the porous layer being determined based on a best fit result found in the repeated computer-implemented fitting.

5. The method according to claim 1,
wherein the porous layer comprises a first sub-layer and a second sub-layer,
the physical properties comprising at least:
   a layer thickness of the first sub-layer,
   a porosity of the first sub-layer,
   a roughness of the first sub-layer at an interface with a substrate supporting the layer,
   a layer thickness of the second sub-layer,
   a porosity of the second sub-layer,
   a roughness of the second sub-layer at an interface with the first sub-layer.

6. The method according to claim 5,
the method comprising:
   setting a predefined first roughness start value and a predefined second roughness start value,
   setting a first porosity start value and a second porosity start value, each based on knowledge of a manufacturing process for forming the porous layer, setting a first layer thickness start value relating to a thicker of the first and of the second sub-layers based on an evaluation of periodic fluctuations with a smallest fluctuation period of reflectance intensities within the detected reflectance curve, and
   setting a second layer thickness start value relating to a thinner of the first and second sub-layers,
   wherein, in a first step of the method, a first thickness and a first porosity of the thicker of the first and second sub-layers are determined by computer-implemented fitting of the detected reflectance curve using the non-linear least squares method based on the first and second roughness start values, the first and second porosity start values and the first and second layer thickness start values.

7. The method according to claim 6,
wherein the second layer thickness start value is set based on knowledge concerning a manufacturing process for forming the thinner sub-layer.

8. The method according to claim 6,
wherein, in a second step of the method, a second thickness and a second porosity of the thinner of the first and second sub-layers are determined by computer-implemented fitting of the detected reflectance curve using a non-linear least squares method, with fitting being carried out based on a first layer thickness start value and a first porosity start value derived from fit results of the preceding first step of the method.

9. The method according to claim 8,
wherein, in a third step of the method, a first roughness of the thicker sub-layer and a second roughness of the thinner sub-layer are determined by computer-implemented fitting of the detected reflectance curve using the non-linear least squares method, with fitting being carried out based on first and second layer thickness start values and first and second porosity start values derived from fit results of the preceding first step and the preceding second step of the method.

10. The method according to claim 9,
wherein, in a fourth step of the method, all of the physical properties of the first and second sub-layers are determined by computer-implemented fitting of the detected reflectance curve using the non-linear least squares method, with fitting being carried out based on first and second layer thickness start values, first and second porosity start values and first and second roughness start values derived from fit results of the preceding first step, the preceding second step and the preceding third step of the method.

11. The method according to claim 1,
wherein the physical properties are determined in a plurality of successive runs of the method at a plurality of positions along the surface of the substrate, the physical properties being determined at a second and subsequent instances of the plurality of positions by computer-implemented fitting of the detected reflectance curve using a non-linear least squares method, with fitting being carried out based on first and second layer thickness start values, first and second porosity start values, and first and second roughness start values derived from fit results of a previous run of the method performed at a respective neighboring position.

12. An apparatus configured to perform or control the method according to claim 1, the apparatus further comprising a reflectance measuring device to measure the reflectance curve to be detected upon performing the method.

13. A computer-readable medium having a computer program product comprising computer-readable instructions which, when executed by a computer, direct the computer to execute or control the method according to claim 1.

* * * * *